(12) United States Patent
Hood et al.

(10) Patent No.: US 7,349,875 B1
(45) Date of Patent: Mar. 25, 2008

(54) BASIC AND INTERMEDIATE NET INTEREST REVENUE IMPLEMENTATIONS FOR FINANCIAL PROCESSING IN A RELATIONAL DATABASE MANAGEMENT SYSTEM

(75) Inventors: George Robert Hood, Poway, CA (US); Paul H. Phibbs, Jr., Escondido, CA (US)

(73) Assignee: NCR Corp., Dayton, OH (US)

( * ) Notice: Subject to any disclaimer, the term of this patent is extended or adjusted under 35 U.S.C. 154(b) by 1500 days.

(21) Appl. No.: 09/610,646

(22) Filed: Jun. 29, 2000

(51) Int. Cl.
*G06Q 40/00* (2006.01)
(52) U.S. Cl. ...................................................... 705/35
(58) Field of Classification Search ............... 705/8, 705/30, 35, 38
See application file for complete search history.

(56) References Cited

U.S. PATENT DOCUMENTS

| | | | |
|---|---|---|---|
| 5,189,608 A | | 2/1993 | Lyons et al. |
| 5,237,498 A | * | 8/1993 | Tenma et al. .................. 705/30 |
| 5,249,120 A | | 9/1993 | Foley |
| 5,615,109 A | | 3/1997 | Eder |
| 5,655,085 A | | 8/1997 | Ryan et al. |
| 5,712,987 A | | 1/1998 | Waits et al. |
| 5,721,831 A | | 2/1998 | Waits et al. |

(Continued)

FOREIGN PATENT DOCUMENTS

WO     WO 00/62224     10/2000

OTHER PUBLICATIONS

Curley, Bob, "Royal Bank unearths profitability solution," Bank Systems & Technology, Apr. 2000, 2 pages.*

(Continued)

*Primary Examiner*—Andrew Joseph Rudy
(74) *Attorney, Agent, or Firm*—Gates & Cooper LLP

(57) ABSTRACT

A financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

| Profit | = Net Interest Revenue (NIR) |
|---|---|
| | + Other Revenue (OR) |
| | − Direct Expense (DE) |
| | − Indirect Expense (IE) |
| | − Risk Provision (RP) |

In this calculation, the Net Interest Revenue (NIR) comprises:

| NIR | = Interest Revenue |
|---|---|
| | − Cost of Funds |
| | + Value of Funds |
| | − Interest Expense. |

66 Claims, 4 Drawing Sheets

U.S. PATENT DOCUMENTS

| | | | |
|---|---|---|---|
| 5,819,237 A | 10/1998 | Garman | |
| 5,911,135 A | 6/1999 | Atkins | |
| 5,991,743 A | 11/1999 | Irving et al. | |
| 6,026,382 A | 2/2000 | Kalthoff | |
| 6,085,175 A | 7/2000 | Gugel et al. | |
| 6,112,190 A * | 8/2000 | Fletcher et al. | 705/38 |
| 6,233,566 B1 | 5/2001 | Levine et al. | |
| 6,240,399 B1 | 5/2001 | Frank et al. | |
| 6,249,770 B1 * | 6/2001 | Erwin et al. | 705/10 |
| 6,253,192 B1 | 6/2001 | Corlett et al. | |
| 6,275,813 B1 | 8/2001 | Berka | |
| 6,292,787 B1 | 9/2001 | Scott et al. | |
| 6,343,272 B1 * | 1/2002 | Payne et al. | 705/4 |
| 6,360,210 B1 * | 3/2002 | Wallman | 705/36 |
| 6,393,406 B1 | 5/2002 | Eder | |
| 6,477,510 B1 * | 11/2002 | Johnson | 705/30 |
| 6,571,219 B1 * | 5/2003 | Spivey | 705/36 |
| 2002/0026394 A1 | 2/2002 | Savage et al. | |

OTHER PUBLICATIONS

Price et al., "College Accounting", Glencoe Macmillan/McGraw-Hill, Seventh Edition, 1994, pp. 28-41, 529-531, 966-982.*

Ainsworth et al., "Introduction to Accounting: An Integrated Approach", Preliminary Edition, 1996, vol. 2, chapter 22.*

John R. Johnson, Raising Relationships, Bank Marketing, Jun. 1999, pp. 16-24.*

John R. Johnson, Raising Relationships, Bank Marketing, Jun. 1999, pp. 30-36, footnote 1.*

Kassing, Jay, "Profitability: Growing the Bottom Line," CSI, 1999, 43 pages.

"Canadian Bank Mines for Data-based Gold," Action Items, Dec. 2, 1997, 2 pages.

"Bank of Ireland Selects Compaq AlphaServers to Help Improve Profitability Management," Dec. 3, 1998, Compaq, 2 pages.

"Marquis Tops 300 MCIF-CRM Data Mart Clients Worldwide," Apr. 18, 2000, 2 pages.

* cited by examiner

BASIC AND INTERMEDIATE NET INTEREST REVENUE IMPLEMENTATIONS FOR FINANCIAL PROCESSING IN A RELATIONAL DATABASE MANAGEMENT SYSTEM

CROSS REFERENCE TO RELATED APPLICATIONS

This application is related to the following co-pending and commonly assigned patent applications:

application Ser. No. 09/608,355, entitled "ADVANCED AND BREAKTHROUGH NET INTEREST REVENUE IMPLEMENTATION FOR FINANCIAL PROCESSING IN A RELATIONAL DATABASE MANAGEMENT SYSTEM," filed on same date herewith, by George Robert Hood and Paul H. Phibbs, Jr.;

application Ser. No. 09/608,681, entitled "OTHER REVENUE IMPLEMENTATION FOR FINANCIAL PROCESSING IN A RELATIONAL DATABASE MANAGEMENT SYSTEM," filed on same date herewith, by George Robert Hood;

application Ser. No. 09/608,675, entitled "DIRECT EXPENSE IMPLEMENTATION FOR FINANCIAL PROCESSING IN A RELATIONAL DATABASE MANAGEMENT SYSTEM," filed on same date herewith, by George Robert Hood;

application Ser. No. 09/608,342, entitled "INDIRECT EXPENSE IMPLEMENTATION FOR FINANCIAL PROCESSING IN A RELATIONAL DATABASE MANAGEMENT SYSTEM," filed on same date herewith, by George Robert Hood; and application Ser. No. 09/608,682, entitled "RISK PROVISION IMPLEMENTATION FOR FINANCIAL PROCESSING IN A RELATIONAL DATABASE MANAGEMENT SYSTEM," filed on same date herewith, by George Robert Hood; and all of which are incorporated by reference herein.

BACKGROUND OF THE INVENTION

1. Field of the Invention

This invention relates in general to financial processing systems performed by computers, and in particular, to the implementation of "net interest revenue" calculations for financial processing using data accessed from a relational database management system.

2. Description of Related Art

Financial processing systems provide tools for financial analysis of accounting data. Typically, each financial processing system operates in a unique way and approaches financial analysis differently. Some financial processing systems are advanced in their approach to profitability calculations, and others are still at a more basic level. In addition, there is no agreement as to the rules for profitability calculations, outside of generally accepted accounting policies that external auditors use.

Yet, the majority of financial processing systems attempt to use profitability calculations to differentiate between sources of revenues and expenses. There is a need, then, for a flexible approach to profitability calculations in terms of the overall metric, as well as the type of data used.

SUMMARY OF THE INVENTION

A Value Analyzer is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

| Profit | = Net Interest Revenue (NIR) |
|---|---|
| | + Other Revenue (OR) |
| | − Direct Expense (DE) |
| | − Indirect Expense (IE) |
| | − RiskProvision (RP) |

In this calculation, the Net Interest Revenue (NIR) comprises:

| NIR | = Interest Revenue |
|---|---|
| | − Cost of Funds |
| | + Value of Funds |
| | − Interest Expense. |

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
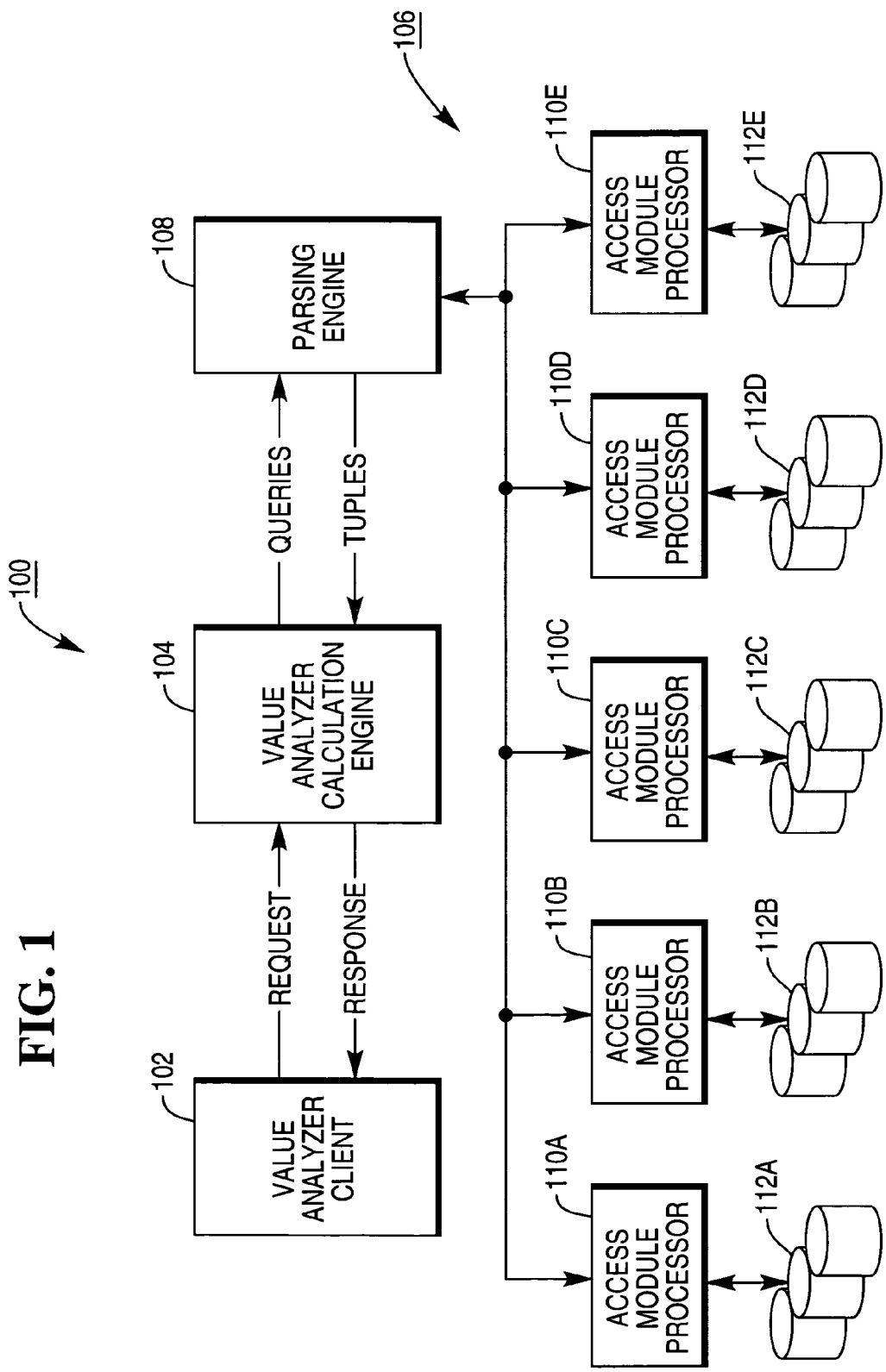
FIG. 1 illustrates an exemplary hardware and software environment according to the preferred embodiment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

OVERVIEW

The Value Analyzer is a data-driven computer-facilitated financial model that provides accurate and consistent profitability calculations using account, event and organization data stored in a relational database management system (RDBMS), wherein: (1) the account attributes comprise data about accounts being measured, (2) the event attributes comprise data about account-related transactions, and (3) the organization attributes comprise data about the organization's financial status. The profitability calculations performed by the Value Analyzer rely on a Five Factor Atomic Profit Metric (FFAPM):

$$\begin{aligned}\text{Profit} &= \text{Net Interest Revenue (NIR)} \\ &+ \text{Other Revenue (OR)} \\ &- \text{Direct Expense (DE)} \\ &- \text{Indirect Expense (IE)} \\ &- \text{Risk Provision (RP)} \\ &= \text{NIR} + \text{OR} - \text{DE} - \text{IE} - \text{RP}\end{aligned}$$

In the above equation, it is assumed that the sign of elements that reduce profit are negative and those that contribute are positive.

Each of the five factors of FFAPM are defined below:

Net Interest Revenue. This component comprises interest revenue, and is the largest component of profitability (e.g., from loans, deposits, cash, etc.).

Other Revenue. This component comprises non-interest revenue (e.g., fees and commissions), including those driven by events (e.g., open account, excessive counter withdrawals, early payout penalties, etc.).

Direct Expense. This component comprises expenses driven by events that are attributable to accounts.

Indirect Expense. This component comprises expense that are not attributable to specific accounts. This includes expenses that relate to the cost of doing business that are not driven by account or event activity, such as those that arise from overheads, inefficiencies or differences between standard and actual costs (e.g., the CEO's salary, etc.).

Risk Provision. This component comprises the expected cost of risks that arise from the uncertainties of doing business, e.g., market risks, customer credit, competition, operations, regulatory risks, political risks, etc.

Each of these five factors can be measured for a desired period (daily, weekly, monthly, quarterly, etc.). Moreover, each factor is essentially discrete and independent with fundamentally different characteristics, which strengthens the user's ability to fully utilize the output to determine relationships between account, event and organization data, and enable consistent multiple dimensional aggregation.

The FFAPM is "atomic" in that profitability is computed using data stored in a relational database management system (RDBMS). There are three aspects to this:

components of profitability may be measured below the account level (at events which make up account activity over an accounting period) and accumulated to the account, components of profitability may be measured directly at the account level (such as interest paid or earned for an accounting period), components of profitability may be known, obtained, or aggregated at a higher level, and may be apportioned down to specific accounts and events according to various rules.

The Value Analyzer generally defines "indirect" components of profitability to be those which must be apportioned to accounts and "direct" components to be those which are either computed at the account level, or are rolled up to the account level from lower level events.

Hardware and Software Environment

FIG. 1 illustrates an exemplary hardware and software environment according to the preferred embodiment of the present invention. In the exemplary environment, a computer system 100 implements a financial processing system in a three-tier client-server architecture, wherein the first or client tier provides a Value Analyzer Client 102 that may include, inter alia, a graphical user interface (GUI), the second or middle tier provides a Value Analyzer Calculation Engine 104 for performing profitability calculations as described later in this application, and the third or server tier comprises a Relational DataBase Management system (RDBMS) 106 that stores the data and metadata necessary for performing the profitability calculations from the data and metadata stored in a relational database. The first, second, and third tiers may be implemented in separate machines, or may be implemented as separate or related processes in a single machine.

In the preferred embodiment, the Value Analyzer Client 102 and the Value Analyzer Calculation Engine 104 together are referred to as the Value Analyzer. Generally, the Value Analyzer Client 102 includes a graphical user interface (GUI) for operators of the system 100, wherein requests are transmitted to the Value Analyzer Calculation Engine 104 and responses are received therefrom. The Value Analyzer Calculation Engine 104 performs the profitability calculations and other processing, including commands or functions for performing various search and retrieval functions in the RDBMS 106, wherein queries are transmitted to the RDBMS 106 as requests and tuples are received therefrom as responses. The Value Analyzer Client 102 and the Value Analyzer Calculation Engine 104 may be implemented in separate machines, or may be implemented as separate or related processes in a single machine.

In the preferred embodiment, the RDBMS 106 includes at least one Parsing Engine (PE) 108 and one or more Access Module Processors (AMPs) 110A-110E storing the relational database in one or more data storage devices 112A-112E. The Parsing Engine 108 and Access Module Processors 110 may be implemented in separate machines, or may be implemented as separate or related processes in a single machine. The RDBMS 106 used in the preferred embodiment comprises the Teradata® RDBMS sold by NCR Corporation, the assignee of the present invention, although other DBMSs could be used.

In the preferred embodiment, the system 100 may use any number of different parallelism mechanisms to take advantage of the parallelism offered by multiple Access Module Processors 110. Further, data within the relational database may be fully partitioned across all data storage devices 112 in the system 100 using hash partitioning or other partitioning methods.

Generally, the Value Analyzer Client 102, Value Analyzer Calculation Engine 104, RDBMS 106, Parsing Engine 108, and/or Access Module Processors 110A-110E comprise logic and/or data tangibly embodied in and/or accessible from a device, media, carrier, or signal, such as RAM, ROM, one or more of the data storage devices 112A-112E, and/or a remote system or device communicating with the computer system 100 via one or more data communications devices.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Value Analyzer Data Flow

Figure 2:
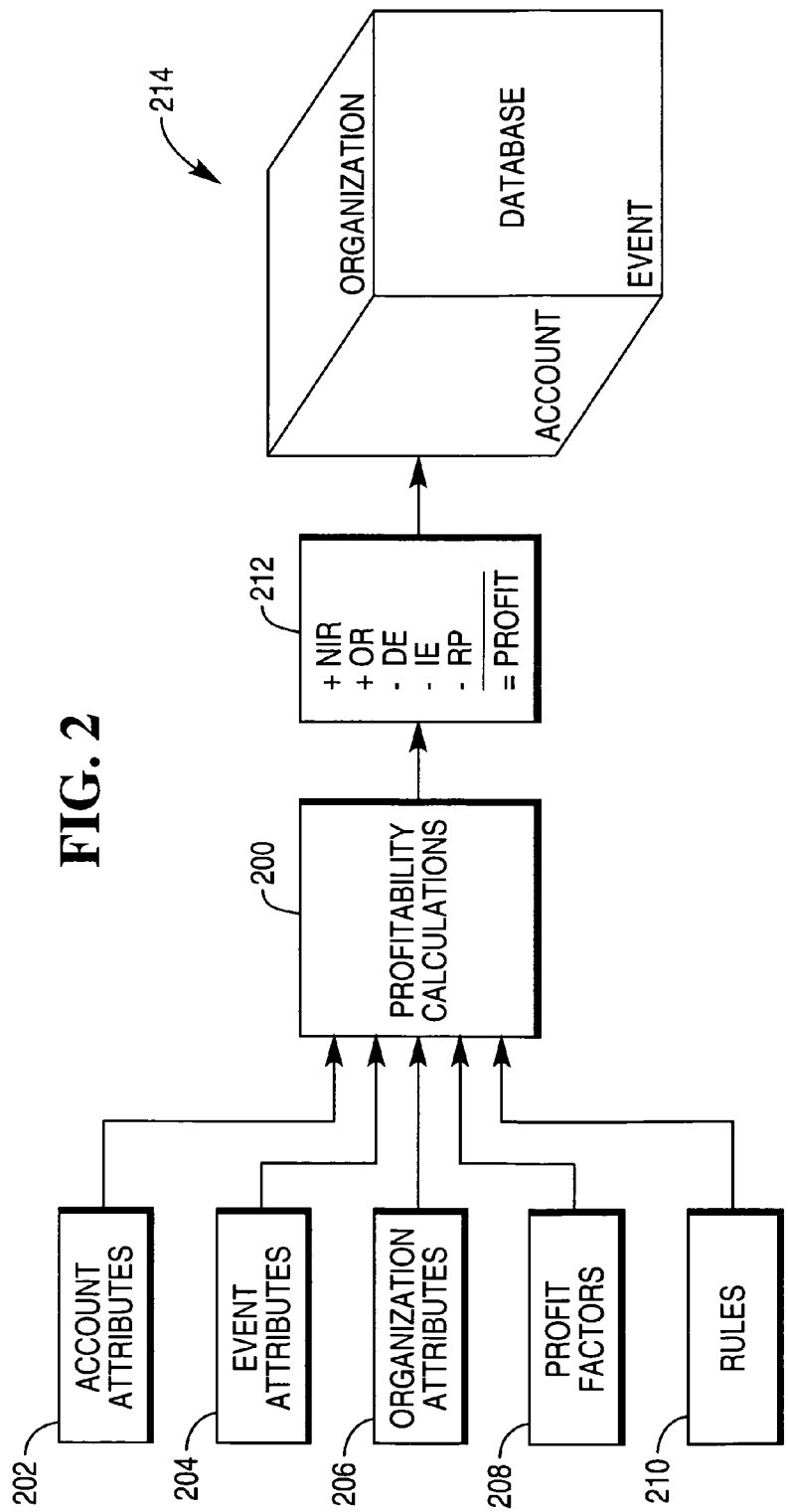
FIG. 2 is a data flow diagram that illustrates the operation of the Value Analyzer according to the preferred embodiment of the present invention.

FIG. 2 is a data flow diagram that illustrates the operation of the Value Analyzer Calculation Engine 104 according to the preferred embodiment of the present invention. Within the Value Analyzer Calculation Engine 104, one or more Profitability Calculations 200 accept a number of inputs including Account Attributes 202, Event Attributes 204, Organization Attributes 206, and Profit Factors 208. Thereafter, the Profitability Calculations 200 invoke one or more Rules 210 that generate the FFAPM 212, which in turn are used to create the Database 214. The Database 214 may be represented along account, event, or organization dimensions, or along other dimensions as may be required. These elements are described in more detail below.

Input Definitions

Account Attributes 202 comprise data about the accounts being measured. This data includes: balance, rate (or interest accrued), product identification, limits, expected default frequency, and various dates (e.g., open, rate reset, last payment, next payment, maturity, etc.).

Event Attributes 204 comprise data about account-related events or transactions. This data includes: account identification, event or transaction amounts, event or transaction location, event or transaction time, counter-party identification, event or transaction type (e.g., loan payment, interest paid, load draw down amount, etc.).

Organization Attributes 206 comprise data about the financial status of the organization. This data includes: balance sheet and profit statement amounts aggregated by the legal or management entities that own the account base being measured.

Profit Factors 208 include parameter values necessary to perform the Profitability Calculations 200. The major classifications of this data include:

- Funds transfer rates are pricing methods that require matched maturity opportunity rates for use in valuing each account's marginal use or source of internal funds.
- Unit costs are used for Direct Expense calculations, where a total cost is provided as an Organization Attribute 206 and the Unit Cost is then derived by dividing total cost by actual volume. Unit Costs can be either standard, actual, or market, and ideally represent marginal values (if "fully absorbed measures" are used, then the usefulness of allocated amounts is diminished.)
- Allocated amounts are used in both Other Revenue and Indirect Expense calculations, wherein the allocated amounts are apportioned amongst all accounts in a group.
- Miscellaneous calculation values may comprise, for example, the number of days in a profit measurement period, an equity allocation weighting, etc. These values are known as "modeling" parameters.
- Amortization parameters are used in interest amortization, which requires interest rates and life values used by straight line amortization and by declining balance of amortization.
- Risk measurement parameters are used in Risk Provision calculations, which require various factors, such as: loss rates, reserve percentages, exposure factors, recovery rates, default probabilities and collection costs.
- Tax rates are required for after-tax profit calculation. The Value Analyzer is designed to calculate pre-tax income on a taxable equivalent basis (where an effective tax rate is all that is required to transform pre-tax income into after tax earnings, i.e., Profit).

Rules

The Profitability Calculations 200 use one or more Rules 210 applied to data retrieved from the RDBMS 106. These Rules 210 include, inter alia, the following:

Treatments. Every account with cash flows affecting a organization's balance sheet requires a method of valuing the account's use of internal funds. One approach is "matched maturity Funds Transfer Pricing," which uses a canonical representation of an account's funding characteristics and then determines a value based on adjusted market yields for each instance that requires an interest rate transfer price to calculate an account's marginal Net Interest Revenue.

Equity Allocation. In order to provide precise Net Interest Revenue calculations, the amount of equity funds required at an account must be determined. This rule allows for equity allocation using any of the following methods: simple ratios; regulatory definitions; economic allocations, or user defined allocations.

Apportionment. Other Revenue, Risk Provision and Indirect Expense calculations are applied at the account level using Organization Attributes 206 that are not related directly to account activity. These profit adjustments are made so that the sum of all account-level Profitability Calculations 200 comprises the overall profit. One approach is to pool indirect costs and revenues and then apportion them. Apportionment rules specify how the pooled indirect costs and revenues is completely allocated to appropriate accounts, wherein the preferred embodiment uses closed form allocations, which require only information known in the current period and not iterative computation.

Amortization. Some types of income or expense are deferred or accrued over multiple periods, including and subsequent to the current accounting period. This i common to accrual accounting methods used in profit presentations of financial statements, and gives rise to timing differences between cash flows and their related profit as presented in a financial statement in any accounting period. Since the Value Analyzer is designed to reconcile to the financial statement's profit values, it supports deferral and accrual accounting principles. Amortization methods that account for these timing differences are: interest amortization (used for Interest Revenue and expense accruals and for deferral of fees that are in lieu of interest), and straight line or declining balance amortizations (used for cost deferrals and investment depreciation).

Other Revenue Pricing. In situations where account and event activity can be used to derive account level income or fees, the Value Analyzer calculates these drivers of the profitability in the Other Revenue calculations. These calculations comprise linear combinations of event or account values and modeled coefficients.

Direct Expense. The calculation of account profit adjustments due to account-related activity requires rules that take the form of linear combinations of event or account values and modeled coefficients.

Indirect Expense. In situations where expense apportionment or amortization amounts are aggregated, the user may want different rules applied. These rules allow for multiple profit calculations rules to be applied to derive multiple account level Indirect Expense amounts.

Risk Provision. Adjusting current profit for expected future losses is known as "actuarial" profit provisioning. The Value Analyzer applies actuarial-based methods in its account level profit calculations, where the actuarial reserve that the provisions maintain represents the expected loss associated with all accounts.

Taxable Equivalent Gross-up. Profit is an after-tax measure, and thus some events or portions of some accounts' profits may be excluded from normal taxation. The Value Analyzer adjusts these pre-tax values, so that a singular tax rate can be used to convert pre-tax profit into after-tax values, which are also known as taxable equivalent adjustment. These rules use account and event attributes to adjust each of the five factors of the FFAPM to a taxable equivalent basis.

Interest Yield Adjustments. Since the Value Analyzer can calculate profits for any number of periods, the adjustment of cash interest payments, and the financial statement's accrual or smoothed representation of interest-related Profit, the Value Analyzer provides a method for converting cash interest amounts to accrual amounts for financial statements. The Value Analyzer implements an "effective interest rate" conversion to accomplish this type of calculation.

Profitability Calculations

The following describes the method used by the Profit Calculations 200:

1. Retrieve data from the RDBMS 106.
2. Calculate Net Interest Revenue for every account.
3. Calculate Other Revenue for every account.
4. Calculate Direct Expense for every account.
5. Calculate Indirect Expense for every account.
6. Calculate Risk Provision for every account.
7. Calculate Profit for every account.
8. Store the FFAPM Profit and the five factors of FFAPM into the RDBMS 106.
9. Aggregate and/or re-calculate the FFAPM Profit and the five factors of FFAPM as necessary.

Note that steps 2 through 6 perform account-level calculations. Steps 2, 3, 4, 5, and 6 can be performed independently and in parallel, while step 7 requires values derived in steps 2, 3, 4, 5, and 6, and therefore must be performed after steps 2, 3, 4, 5, and 6 are completed.

Output Definition

The Profit Calculations 200 generate one or more values for the five factors of the FFAPM 212, and specifically, the NIR, OR, DE, IE, RP, and Profit values. These values are used to generate the output data 214, which can be stored by the RDBMS 106 in the relational database.

Analytic Variations

The Value Analyzer operates on data and calculations across a continuum, in order to provide the analytic variations necessary for financial processing at various levels of aggregation. This continuum is comprised of multiple tiers as described below:

basic—>intermediate—>advanced—>breakthrough.

Not every tier is necessarily present for each element of data or every calculation.

This continuum embodies the notion of inheritance, wherein the data and calculations of the higher tiers embody the data and calculations of the lower tiers. The principle of inheritance means that the data and calculations by which the separate tiers are defined are nested, i.e., the definition of "intermediate" includes the definition of "basic," but with added functionality that goes beyond "basic," and so on. Thus, there is consistency in the data and calculations performed at the different tiers in the continuum.

Net Interest Revenue

Generally, Net Interest Revenue (NIR) is defined by the following calculation:

```
NIR  = Interest Revenue
       − Cost of Funds
       + Value of Funds
       − Interest Expense
       + Earnings on Allocated Equity (optional)
```

These various elements (and sub-elements thereof) are described in more detail below.

Net Interest Revenue is calculated for every account based on the account's use of the balance sheet (funds used or provided). The Net Interest Revenue thus represents the total interest made from all deposit and lending activities (income less expenses).

Net Interest Revenue is designed to enable a common incremental measurement of return across a balance sheet using products, services, customers, and accounts, as each usage is valued against the opportunity of using the same funds in the marketplace, defined as the wholesale market yield curve. This ensures that analysis of returns is consistent and comparable.

Figure 3:
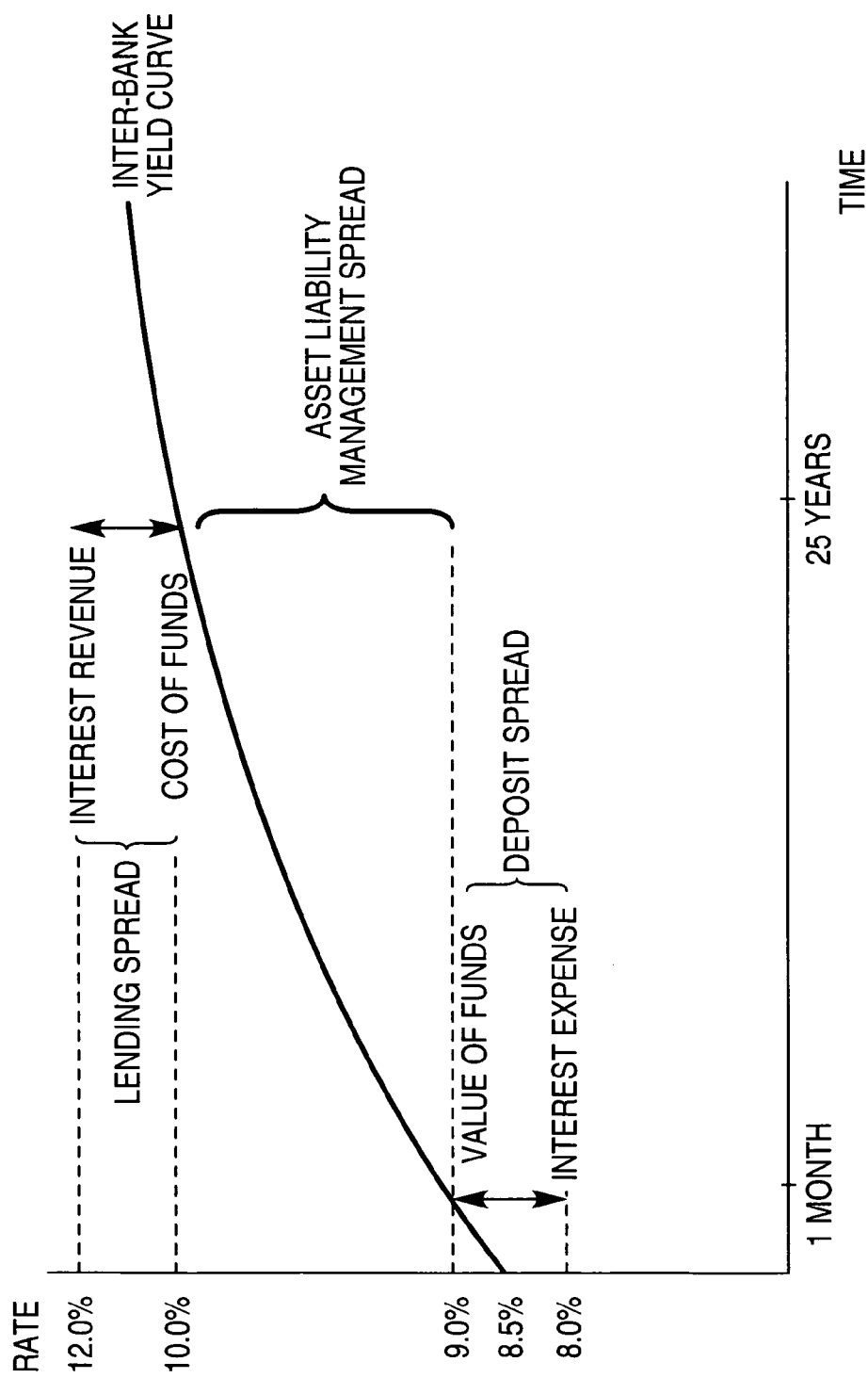
FIG. 3 is a chart that illustrates three components of Net Interest Revenue according to the preferred embodiment of the present invention.

The chart of FIG. 3 illustrates three components of Net Interest Revenue: Deposit Spread, Lending Spread, Asset/Liability Management (ALM) Spread. The Value Analyzer calculates the Deposit Spread and Lending Spread, and the ALM Spread can be derived.

Deposit Spread

The Net Interest Revenue on a deposit account is shown in FIG. 3 as "Deposit Spread," which comprises the difference between Interest Expense and the Value of Funds. For example, the Deposit Spread is the income made on a deposit account and is the difference between the rate paid on customer borrowings (Interest Expense) and the rate at which the funds borrowed from the customer could be invested in the wholesale market (Value of Funds).

Interest Expense

The Interest Expense is the cost of borrowing activities undertaken by the organization. At an account level, it represents the interest rate paid on the account and is calculated as (rate*balance). When a customer has a deposit facility with the organization, they are, in effect, lending their funds to the organization, for an agreed upon return during an agreed upon period. The rate paid to the customer on the deposit is an expense to the organization. For example, a $100 three month term deposit with an interest rate of 8%, i.e., the customer is owed a total of $102 by the bank at the 3 month maturity of the deposit, which comprises an interest expense to the bank of $2.

Value of Funds

At an account level, the Value of Funds (VOF) represents the rate at which funds borrowed through retail deposit gathering activities could be invested in the wholesale market. For example, the $100 borrowed in the above example, could be invested in a 90 day bank bill with a return of 9%, which comprises a Value of Funds of $100*9% *0.25=$2.25.

The Value Analyzer computes the Value of Funds and obtains the Interest Expense for every deposit account. The appropriate Interest Expense amounts are assumed to be supplied to the Value Analyzer from the RDBMS 106, but may be calculated, if required.

These two components are used to calculate the total Deposit Spread for the account. Using the above example, the Deposit Spread generated by this 3 month term account is $0.25 (Value of Funds−Interest=$2.25−$2.00).

Both the Value of Funds and the Cost of Funds are theoretical constructs, rather than actual rates. The Value of Funds and the Cost of Funds represent the organization's opportunity cost, i.e., the alternative return that the organization could receive by investing lent funds in the wholesale market, or the alternative cost the organization would incur to borrow funds in the wholesale market.

For given maturity and behavioral characteristics, the Value of Funds and the Cost of Funds are the same rates. Theoretically, these rates are chosen as the rates at which the organization can invest or acquire large quantities of funds (a) on demand and (b) at any maturity.

Lending Spread

The Lending Spread is the income made from lending activities, which comprises the difference between the Cost of Funds and the Interest Revenue. This margin is calculated as the difference between the rate at which a loan is granted to a customer (Interest Revenue) and the rate at which the funds would have been borrowed in the wholesale market (Cost of Funds).

Interest Revenue

The Interest Revenue is the return generated by lending activities undertaken by the organization. All lending activities are associated with risk that a customer will default, and this risk is intensified as the loan term increases. According to modern portfolio theory, increased risk is coupled with increased return and thus a premium is charged on retail loan and credit facilities. These retail loans and credit facilities are assets to the organization, and are known as earnings assets. The Interest Revenue at an account level is the revenue generated from the organization's investment in the loan or credit facility and is calculated as (balance*rate). For example, a one year $1,000 loan payable on maturity and charging interest of 12%, would be an asset of $1,120 to the organization, which comprises an Interest Revenue (or cash flow) to the organization of $120.

Cost of Funds

At an account level, the Costs of Funds (COF) represents the rate at which funds lent to a customer would have been borrowed in the inter-bank market. For example, the $1,000 lent in the above example, could have been borrowed by buying a one-year negotiable certificate of deposit in the wholesale market with an interest cost of 10%. This represents a Cost of Funds of $1,000*10% =$100.

The Value Analyzer computes the Cost of Funds and obtains the Interest Revenue for every loan account. The appropriate Interest Revenue amounts are assumed to be supplied to the Value Analyzer from the RDBMS 106, but might be calculated, if required. These two components are used to calculate the total Lending Spread for the account. Using the above example, the Lending Spread generated by this loan account is $20 (Interest Revenue–Cost of Funds=$120–$100).

The calculation of the appropriate Cost of Funds and Value of Funds is known as Funds Transfer Pricing, which results in a Transfer Price, also known as a Treatment Rate. The Value Analyzer utilizes the Funds Transfer Pricing methodologies employed by the organization.

Asset/Liability Management Spread

Both the Lending Spread and Deposit Spread are customer spreads, i.e., these margins are driven by the lending to and borrowing from retail customers. However, there is generally a difference between the Value of Funds and the Cost of Funds, representing a mismatch in maturity profiles of the retail book. This results from a mismatch in the term or duration of the deposit and loan products.

This difference or mismatch is known as an asset/liability mismatch and the spread resulting from the mismatch is recognized as an Asset/Liability Management (ALM) Spread. The ALM Spread is created by the maturity characteristics of products sold, and it is managed by the investing or hedging activities of the organization on the wholesale market. As funds that are borrowed and lent in the retail market typically have different maturity patterns, a treasury function is to analyze and hedge adequately the organization's portfolio of borrowings and lending to ensure adequate matching of maturities and effective management of interest rate risk.

In some markets, there is little need to separate the impact of interest rate risk from account spreads, such as for organizations that have variable rates of interest on all their products. In these cases, simple valuing techniques may be appropriate. In other markets, such as where product terms are fixed or interest-free balances are stable, some organizations may find that there is a need to separate market-driven profit contributions from customer-driven profit contributions.

This separation is normally accomplished by using Funds Transfer Pricing methods that move the profit impact of maturity mismatches to a treasury function, where the impact of market risk on profits can be managed. Analysis of ALM Spread, which reflects the level of interest rate risk, can be added as a customizable capability.

Capital Allocation

In the above examples, it has been assumed that funds for lending are borrowed from the wholesale/inter-bank market, and deposits are placed in the inter-bank/wholesale market. This approach does not reflect the value of the organization's equity as a source of funds. Some organizations will not adjust the internal profit measure for the value of equity as a source of funds, or include the profit measure's effect only in the profit arising from treasury activities. For organizations that want to include the value of funding by equity, the Value Analyzer provides this capability at the account level. The appropriate level of equity funding can be complicated, wherein a basic method may be to use a constant ratio and a breakthrough method may be to allocate equity based on the risk of the account.

Earnings on Equity

Earnings on Equity (EOE) represents the impact of equity funding on Net Interest Revenue. The appropriate interest rates are an issue specific to the organization. Generally, only loan spreads are adjusted for Earnings on Allocated Equity; however, sophisticated organizations may want to allocate equity to deposit gathering activities, since they are not risk free.

Net Income Revenue in the Basic Tier

Following are the inputs and outputs of the calculation of Net Income Revenue in the Basic Tier:

| Account-level Inputs | Account-level Outputs |
|---|---|
| For the account: | Interest Income |
|   Interest Income | Interest Expense |
|   Interest Expense | Cost of Funds |
|   Average Asset Balance | Value of Funds |
|   Average Liability Balance | |
| Treatment Rates per selected product types | |
| If required to compute Interest Income and Interest Expense for the account: | |
|   Effective Asset Interest Rate | |
|   Effective Liability Interest Rate | |

The Interest Income, Interest Expense, Average Asset Balance, and Average Liability Balance are usually available from the RDBMS 106, although some or all of these elements may be calculated.

In the Basic Tier, there is a single Treatment Rate for each product type, e.g., commercial=8%, individual=4%, etc.

These can be pool rates, although there is only one Treatment Rate per account, and the Treatment Rate per account is defined at the product level and then applied to the accounts.

For those organizations that cannot provide income or expense accruals, then the Effective Asset Interest Rate and the Effective Liability Interest Rate are provided for use in calculations by the Value Analyzer. Alternatively, these effective rates can be calculated by the Value Analyzer from rate information for each account.

For calculating the Net Income Revenue in the Basic Tier, the definitions are used:

AAB(a)=Average Asset Balance of the account a (=0 if null).
ALB(a)=Average Liability Balance of the account a (=0 if null).
eff rate$_{asset}$(a)=Effective interest rate for account a as an asset balance (=0 if null).
eff rate$_{liability}$(a)=Effective interest rate for account a as a liability balance (=0 if null).
TR$_p$=Treatment Rate for this product type.
IR(a)=Interest Revenue of account a.
COF(a)=Cost of Funds for account a.
IE(a)=Interest Expense for account a.
VOF(a)=Value of Funds for account a.

Then, the Value Analyzer calculates the following:
IR(a)=AAB(a)*eff rate$_{asset}$(a) (if calculation required).
COF(a)=AAB(a)*TR$_p$.
IE(a)=ALB(a)*eff rate$_{liability}$(a) (if calculation required).
VOF(a)=ALB(a)*TR$_p$.

After the calculation, as noted above, the Value Analyzer will return, at the account level, the Interest Revenue, Interest Expense, Cost of Funds, and Value of Funds. The calculation of the account-level lending spread (Interest Revenue−Cost of Funds) and deposit spread (Value of Funds−Interest Expense) can also be provided as outputs by the Value Analyzer.

Net Income Revenue in the Intermediate Tier

Following are the inputs and outputs of the calculation of Net Income Revenue in the Intermediate Tier:

| Account-level Inputs | Account-level Outputs |
|---|---|
| For the account: | Interest Income |
|   Average Balance$_{class,state,tier}$ | Interest Expense |
|   Interest Income | Cost of Funds |
|   Interest Expense | Value of Funds |
|   Product Type | |
|   Float Amount | |
| Treatment Rates for account: | |
|   Rate(product type, balance type) | |
| If required to compute Interest Income and Interest Expense for the account: | |
|   Effective Interest Rate$_{class,state,tier}$ | |

The Average Balance$_{class, state, tier}$, Interest Income, Interest Expense, Product Type, and Float Amount are usually available from the RDBMS 106, although some or all of these elements may be calculated.

The Average Balance$_{class, state, tier}$ allows for multiple balances on a single account, and determination of the Treatment Rate based on product type and balance type. The balance type is the combined effect of three balance characteristics as follows:

The "class" characteristic is defined as being either asset or liability. At the end of each day, an account is in one class or the other; some accounts are always of one class, while others (such as Current Accounts in the UK) vary in class over time.

The "state" characteristic is defined as being either cleared, ledger, or float. These are related by the fact that float is the difference between ledger and cleared balances for an account. Note that float is itself always an asset balance, although float balances can occur in accounts which are either assets or liabilities.

The "tier" characteristic is defined to be the tiers used by the organization in supplying balances for the Value Analyzer input.

With regard to Float Amount, this is calculated as (Ledger balance−Cleared balance), which comprises items in the process of collection for the account.

In the Intermediate Tier, there is only one Treatment Rate per product type (based on the class, state, and tier characteristics of the balance type). These can be pool rates, although there is only one Treatment Rate per account, and the Treatment Rate per account is defined at the product level and then applied to the accounts.

The Effective Interest Rate$_{class, state, tier}$ allows for multiple interest rates on a single account, and determination of the effective interest rate based on balance type. Based on the balance types, the Effective Interest Rate for the account is the account rate adjusted for compound payment frequency, day basis, etc.

For calculating the Net Income Revenue in the Intermediate Tier, the following definitions are used:

AB(c,s,t)(a)=Average Balances of account a based on the class (c), state (s), and tier (t) characteristics of the balance type (=0 if null).
eff rate(c,s,t)(a)=Effective interest rate for account a based on the class (c), state (s), and tier (t) characteristics of the balance type.
pt(a)=Product type of account a.
TR(c,s,t)(pt(a))=Treatment Rate for accounts a of this product type, based on the class (c), state (s), and tier (t) characteristics of the balance type.
IR(a)=Interest Revenue of account a.
COF(a)=Cost of Funds for account a.
IE(a)=Interest Expense for account a.
VOF(a)=Value of Funds for account a.

Then, the Value Analyzer calculates the following:
IR(a)=ΣAB (c=asset,s,t)(a)*eff rate(c=asset,s,t)(a) (if calculation required).
COF(a)=ΣAB (c=asset),s,t)(a)*TR(c=asset,s,t)(pt(a)).
IE(a)=ΣAB (c=liability,s,t)(a)*eff rate(c=liability,s,t)(a) (if calculation required).
VOF(a)=ΣAB (c=liability,s,t)(a)*TR(c=liability,s,t)(pt(a)).

After the calculation, as noted above, the Value Analyzer will return, at the account level, Interest Revenue, Interest Expense, Cost of Funds, Value of Funds. The calculation of the account-level lending spread (Interest Revenue−Cost of Funds) and deposit spread (Value of Funds−Interest Expense) can also be provided as outputs by the Value Analyzer.

LOGIC OF THE PREFERRED EMBODIMENT

Figure 4:
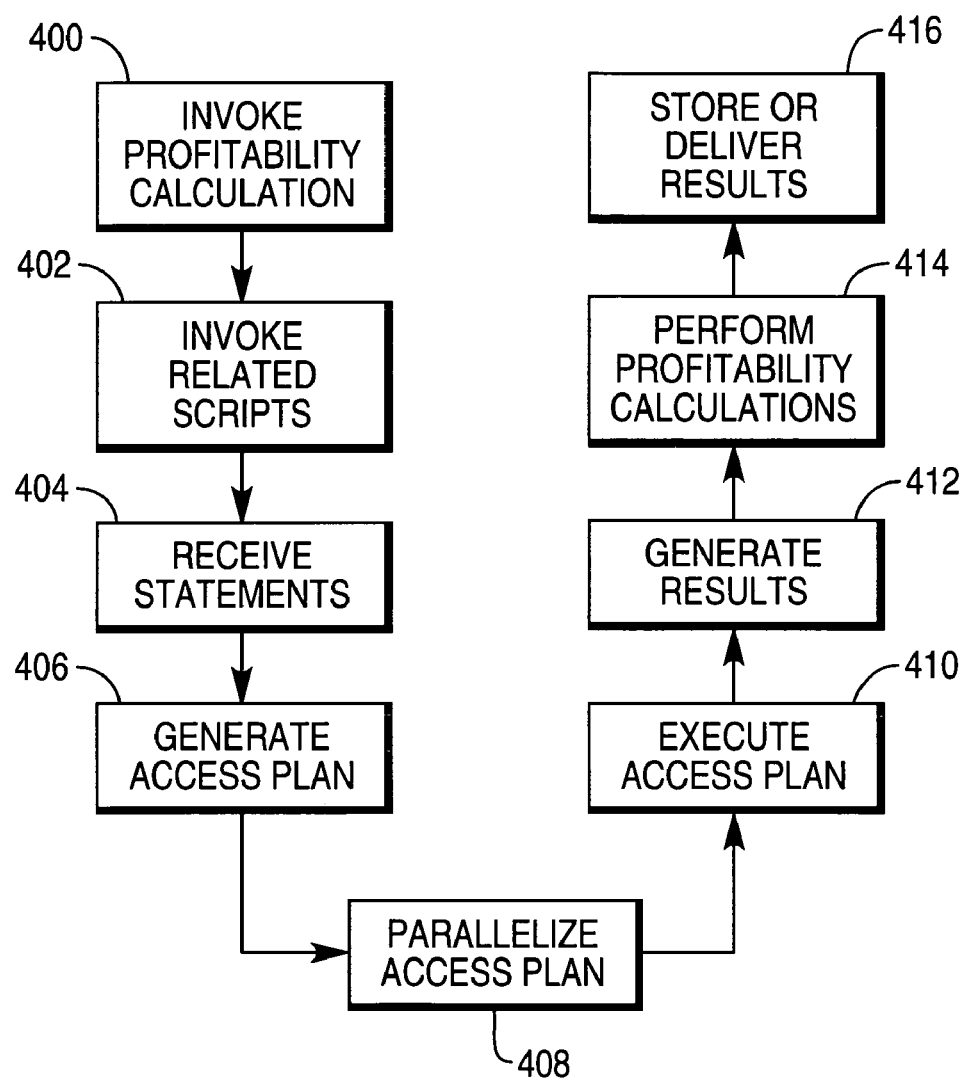
FIG. 4 is a flow chart illustrating the steps necessary for the execution of Profitability Calculations according to the preferred embodiment of the present invention.

FIG. 4 is a flow chart illustrating the steps necessary for the execution of Profitability Calculations 200 according to the preferred embodiment of the present invention. Those skilled in the art will recognize that this logic is provided for illustrative purposes only and that different logic may be used to accomplish the same results.

Block 400 represents the Value Analyzer Client 102 invoking one or more Profitability Calculations 200 in the Value Analyzer Calculation Engine 104.

Block 402 represents the Value Analyzer Calculation Engine 104 invoking one or more scripts related to the invoked Profitability Calculations 200, wherein the scripts comprise SQL statements that are transmitted to the RDBMS 106. These SQL statements access account, event and organization attributes from the database managed by the RDBMS 106.

Block 404 represents the Parsing Engine 108 of the RDBMS 106 receiving the SQL statements and transforming the statements into an operator tree.

Block 406 represents the Parsing Engine 108 of the RDBMS 106 generating one or more access plans from the operator tree.

Block 408 represents the Parsing Engine 108 of the RDBMS 106 parallelizing the access plans, and then transmitting the access plans to their assigned Access Module Processors 110A-110E of the RDBMS 106.

Block 410 represents the Access Module Processors 110A-110E of the RDBMS 106 performing the required data manipulation associated with the access plans received from the Parsing Engine 108, wherein the access plans are performed in parallel by the Access Module Processors 110A-110E.

Block 412 represents the Parsing Engine 108 of the RDBMS 106 merging the results received from the Access Module Processors 110A-110E and providing the merged results to the Value Analyzer Calculation Engine 104 as account, event and organization attributes.

Block 414 represents the Value Analyzer Calculation Engine 104 performing the invoked Profitability Calculations 200 using the account, event and organization attributes accessed from the RDBMS 106, as well as one or more profit factors and one or more rules. In this Block, the Profitability Calculations 200 include:

| | |
|---|---|
| Profit = | Net Interest Revenue (NIR) |
| | + Other Revenue (OR) |
| | − Direct Expense (DE) |
| | − Indirect Expense (IE) |
| | − Risk Provision (RP) | wherein the Net Interest Revenue is calculated for every account, and represents a total interest made from all deposit and lending activities. Specifically, Block 414 calculates Net Interest Revenue (NIR) as:

| | |
|---|---|
| NIR = | Interest Revenue |
| | − Cost of Funds |
| | + Value of Funds |
| | − Interest Expense. |

Note that the Net Interest Revenue may also include earnings on allocated equity, which comprise earnings generated by lending funds from equity sources.

In Block 414, the Net Interest Revenue is calculated from a Deposit Spread, a Lending Spread, and an Asset/Liability Management (ALM) Spread. The Deposit Spread comprises a difference between the Interest Expense and the Value of Funds, wherein the Interest Expense comprises a cost of borrowing funds and the Value of Funds represents a rate at which borrowed funds could be invested. The Lending Spread comprises a difference between the Cost of Funds and the Interest Revenue, wherein the Interest Revenue comprises a return generated by lending funds and the Costs of Funds (COF) represents an expense generated by lending funds. The Asset/Liability Management Spread comprises a difference between maturity characteristics of funds lent.

Moreover, in the Basic Tier, Block 414 calculates Net Income Revenue according to:

$IR(a) = AAB(a) * \text{eff rate}_{asset}(a)$, $COF(a) = AAB(a) * TR_p$, $IE(a) = ALB(a) * \text{eff rate}_{liability}(a)$, and $VOF(a) = ALB(a) * TR_p$ wherein:

AAB(a)=Average Asset Balance of an account a,

ALB(a)=Average Liability Balance of the account a, eff rate$_{asset}$(a)=Effective interest rate for the account a as an asset balance, eff rate$_{liability}$(a)=Effective interest rate for the account a as a liability balance, $TR_p$=Treatment Rate for a product type, IR(a)=the Interest Revenue of the account a, COF(a)=the Cost of Funds for the account a, IE(a)=the Interest Expense for the account a, and VOF(a)=the Value of Funds for the account a.

Additionally, in the Intermediate Tier, Block 414 calculates Net Income Revenue according to:

$IR(a) = \Sigma AB\ (c=asset,s,t)(a) * \text{eff rate}(c=asset,s,t)(a)$, $COF(a) = \Sigma AB\ (c=asset),s,t)(a) * TR(c=asset,s,t)(pt(a))$, $IE(a) = \Sigma AB\ (c=liability,s,t)(a) * \text{eff rate}(c=liability,s,t)(a)$, and $VOF(a) = \Sigma AB\ (c=liability,s,t)(a) * TR(c=liability,s,t)(pt(a)))$, wherein:

AB(c,s,t)(a)=Average Balances of an account a based on class (c), state (s), and tier (t) characteristics of a balance type, eff rate(c,s,t)(a)=Effective interest rate for the account a based on the class (c), state (s), and tier (t) characteristics of the balance type, pt(a)=Product type of an account a, TR(c,s,t)(pt(a))=Treatment Rate for the accounts a of the product type based on the class (c), state (s), and tier (t) characteristics of the balance type, IR(a)=the Interest Revenue of the account a, COF(a)=the Cost of Funds for the account a, IE(a)=the Interest Expense for the account a, and VOF(a)=the Value of Funds for the account a.

In both Tiers, Block 414 generates one or more outputs selected from a group comprising the Interest Revenue, Interest Expense, Cost of Funds, Value of Funds, Lending Spread, and Deposit Spread.

Block 416 represents the Value Analyzer Calculation Engine 104 delivering the output or results from the invoked Profitability Calculations 200 to the Value Analyzer Client 102 and/or the RDBMS 106. With regard to the Value Analyzer Client 102, the results may be presented to the user, printed, or used by various other computer programs, as desired. With regard to the RDBMS 106, the results may be stored for later use by the Value Analyzer Calculation Engine 104, or other computer programs, as desired.

CONCLUSION

This concludes the description of the preferred embodiment of the invention. The following paragraphs describe some alternate embodiments for accomplishing the same invention.

In one alternative embodiment, any type of computer or configuration of computers could be used to implement the present invention. In addition, any database management system, decision support system, on-line analytic processing system, or other computer program that performs similar functions could be used with the present invention.

In summary, the present invention discloses a Value Analyzer, which is a data-driven computer-facilitated financial processing system that accesses account, event and organization attributes from a relational database management database, wherein: (1) the account attributes comprise data about accounts being measured, (2) the event attributes comprise data about account-related transactions, and (3) the organization attributes comprise data about the organization's financial status. Profitability calculations are performed using the account, event and organization attributes accessed from the relational database management system, as well as one or more profit factors and one or more rules. The profitability calculations include the following:

$$\begin{aligned} \text{Profit} = {} & \text{Net Interest Revenue (NIR)} \\ & + \text{Other Revenue (OR)} \\ & - \text{Direct Expense (DE)} \\ & - \text{Indirect Expense (IE)} \\ & - \text{Risk Provision (RP)} \end{aligned}$$

In this calculation, the Net Interest Revenue (NIR) comprises:

$$\begin{aligned} \text{NIR} = {} & \text{Interest Revenue} \\ & - \text{Cost of Funds} \\ & + \text{Value of Funds} \\ & - \text{Interest Expense.} \end{aligned}$$

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of performing financial processing in a computer, comprising:
   (a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;
   (b) performing one or more profitability calculations in the computer using the account, event and organization attributes accessed from the database, as well as one or more profit factors and one or more rules, wherein the profitability calculations include:

$$\begin{aligned} \text{Profit} = {} & \text{Net Interest Revenue (NIR)} \\ & + \text{Other Revenue (OR)} \\ & - \text{Direct Expense (DE)} \\ & - \text{Indirect Expense (IE)} \\ & - \text{Risk Provision (RP)} \end{aligned}$$

(c) wherein the Net Interest Revenue (NIR) is calculated as:

$$\begin{aligned} \text{NIR} = {} & \text{Interest Revenue} \\ & - \text{Cost of Funds} \\ & + \text{Value of Funds} \\ & - \text{Interest Expense.} \end{aligned}$$

2. The method of claim 1, wherein the Net Interest Revenue is calculated for every account.

3. The method of claim 1, wherein the Net Interest Revenue represents a total interest generated from all deposit and lending activities.

4. The method of claim 1, wherein the Net Interest Revenue is calculated from a Deposit Spread, a Lending Spread, and an Asset/Liability Management (ALM) Spread.

5. The method of claim 4, wherein the Deposit Spread comprises a difference between the Interest Expense and the Value of Funds.

6. The method of claim 5, wherein the Interest Expense comprises a cost of borrowing funds.

7. The method of claim 5, wherein the Value of Funds represents a rate at which borrowed funds could be invested.

8. The method of claim 4, wherein the Lending Spread comprises a difference between the Cost of Funds and the Interest Revenue.

9. The method of claim 8, wherein the Interest Revenue comprises a return generated by lending funds.

10. The method of claim 8, wherein the Costs of Funds represents an expense generated by lending funds.

11. The method of claim 4, wherein the Asset/Liability Management Spread comprises a difference between maturity characteristics of funds lent.

12. The method of claim 1, wherein the Net Interest Revenue also includes earnings on allocated equity.

13. The method of claim 12, wherein the earnings on allocated equity comprise earnings generated by lending funds from equity sources.

14. The method of claim 1, further comprising calculating the Net Income Revenue in a Basic Tier according to:

$IR(a)=AAB(a)*\text{eff rate}_{asset}(a)$, $COF(a)=AAB(a)*TR_p$, $IE(a)=ALB(a)*\text{eff rate}_{liability}(a)$, and $VOF(a)=ALB(a)*TR_p$ wherein:

AAB(a)=Average Asset Balance of an account a,

ALB(a)=Average Liability Balance of the account a, eff rate$_{asset}$(a)=Effective interest rate for the account a as an asset balance, eff rate$_{liability}$(a)=Effective interest rate for the account a as a liability balance, $TR_p$=Treatment Rate for a product type p, IR(a)=the Interest Revenue of the account a, COF(a)=the Cost of Funds for the account a, IE(a)=the Interest Expense for the account a, and VOF(a)=the Value of Funds for the account a.

15. The method of claim 14, wherein there is a single Treatment Rate for each product type.

16. The method of claim 14, wherein the step of calculating the Net Income Revenue in the Basic Tier generates one or more outputs selected from a group comprising the Interest Revenue, Interest Expense, Cost of Funds, Value of Funds, Lending Spread, and Deposit Spread.

17. The method of claim 1, further comprising calculating the Net Income Revenue in an Intermediate Tier according to:

IR(a)=ΣAB (c=asset,s,t)(a)*eff rate(c=asset,s,t)(a),
COF(a)=ΣAB (c=asset),s,t)(a)*TR(c=asset,s,t)(pt(a)),
IE(a)=ΣAB (c=liability,s,t)(a)*eff rate(c=liability,s,t)(a), and
VOF(a)=ΣAB (c=liability,s,t)(a)*TR(c=liability,s,t)(pt (a)), wherein:
AB(c,s,t)(a)=Average Balances of an account a based on class (c), state (s), and tier (t) characteristics of a balance type,
eff rate(c,s,t)(a)=Effective interest rate for the account a based on the class (c), state (s), and tier (t) characteristics of the balance type,
pt(a)=Product type of an account a,
TR(c,s,t)(pt(a))=Treatment Rate for the accounts a of the product type based on the class (c), state (s), and tier (t) characteristics of the balance type,
IR(a)=the Interest Revenue of the account a,
COF(a)=the Cost of Funds for the account a,
IE(a)=the Interest Expense for the account a, and
VOF(a)=the Value of Funds for the account a.

18. The method of claim 17, wherein the balance type comprises a combined effect of the class, state, and tier characteristics.

19. The method of claim 18, wherein the class characteristic is defined as either an asset or liability.

20. The method of claim 18, wherein the state characteristic is defined as either cleared, ledger, or float.

21. The method of claim 18, wherein the tier characteristic is defined as tiers used by the organization in supplying balances.

22. The method of claim 17, wherein the step of calculating the Net Income Revenue in the Basic Tier generates one or more outputs selected from a group comprising the Interest Revenue, Interest Expense, Cost of Funds, Value of Funds, Lending Spread, and Deposit Spread.

23. A system for financial processing, comprising:
a computer;
logic, performed by the computer, for:
(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;
(b) performing one or more profitability calculations in the computer using the account, event and organization attributes accessed from the database, as well as one or more profit factors and one or more rules, wherein the profitability calculations include:

$$\begin{aligned} \text{Profit} = &\text{ Net Interest Revenue (NIR)} \\ &+ \text{Other Revenue (OR)} \\ &- \text{Direct Expense (DE)} \\ &- \text{Indirect Expense (IE)} \\ &- \text{Risk Provision (RP)} \end{aligned}$$

(c) wherein the Net Interest Revenue (NIR) is calculated as:

$$\begin{aligned} \text{NIR} = &\text{ Interest Revenue} \\ &- \text{Cost of Funds} \\ &+ \text{Value of Funds} \\ &- \text{Interest Expense.} \end{aligned}$$

24. An article of manufacture embodying logic for performing financial processing in a computer, comprising:
(a) accessing account, event and organization attributes from a database accessible by the computer, wherein: (1) the account attributes comprise data about accounts being measured, (2) the event attributes comprise data about account-related transactions, and (3) the organization attributes comprise data about the organization's financial status;
(b) performing one or more profitability calculations in the computer using the account, event and organization attributes accessed from the database, as well as one or more profit factors and one or more rules, wherein the profitability calculations include:

$$\begin{aligned} \text{Profit} = &\text{ Net Interest Revenue (NIR)} \\ &+ \text{Other Revenue (OR)} \\ &- \text{Direct Expense (DE)} \\ &- \text{Indirect Expense (IE)} \\ &- \text{Risk Provision (RP)} \end{aligned}$$

(c) wherein the Net Interest Revenue (NIR) is calculated as:

$$\begin{aligned} \text{NIR} = &\text{ Interest Revenue} \\ &- \text{Cost of Funds} \\ &+ \text{Value of Funds} \\ &- \text{Interest Expense.} \end{aligned}$$

25. The system of claim 23, wherein the Net Interest Revenue is calculated for every account.

26. The system of claim 23, wherein the Net Interest Revenue represents a total interest generated from all deposit and lending activities.

27. The system of claim 23, wherein the Net Interest Revenue is calculated from a Deposit Spread, a Lending Spread, and an Asset/Liability Management (ALM) Spread.

28. The system of claim 27, wherein the Deposit Spread comprises a difference between the Interest Expense and the Value of Funds.

29. The system of claim 28, wherein the Interest Expense comprises a cost of borrowing funds.

30. The system of claim 28, wherein the Value of Funds represents a rate at which borrowed funds could be invested.

31. The system of claim 27, wherein the Lending Spread comprises a difference between the Cost of Funds and the Interest Revenue.

32. The system of claim 31, wherein the Interest Revenue comprises a return generated by lending funds.

33. The system of claim 31, wherein the Costs of Funds represents an expense generated by lending funds.

34. The system of claim 27, wherein the Asset/Liability Management Spread comprises a difference between maturity characteristics of funds lent.

35. The system of claim 23, wherein the Net Interest Revenue also includes earnings on allocated equity.

36. The system of claim 35, wherein the earnings on allocated equity comprise earnings generated by lending funds from equity sources.

37. The system of claim 23, further comprising logic for calculating the Net Income Revenue in a Basic Tier according to:

$IR(a) = AAB(a) * \text{eff rate}_{asset}(a),$
$COF(a) = AAB(a) * TR_p,$
$IE(a) = ALB(a) * \text{eff rate}_{liability}(a), \text{ and}$
$VOF(a) = ALB(a) * TR_p$ wherein:
AAB(a)=Average Asset Balance of an account a,
ALB(a)=Average Liability Balance of the account a,
eff rate$_{asset}$(a)=Effective interest rate for the account a as an asset balance,
eff rate$_{liability}$(a)=Effective interest rate for the account a as a liability balance,
$TR_p$=Treatment Rate for a product type p,
IR(a)=the Interest Revenue of the account a,
COF(a)=the Cost of Funds for the account a,
IE(a)=the Interest Expense for the account a, and
VOF(a)=the Value of Funds for the account a.

38. The system of claim 37, wherein there is a single Treatment Rate for each product type.

39. The system of claim 37, wherein the logic for calculating the Net Income Revenue in the Basic Tier generates one or more outputs selected from a group comprising the Interest Revenue, Interest Expense, Cost of Funds, Value of Funds, Lending Spread, and Deposit Spread.

40. The system of claim 23, further comprising logic for calculating the Net Income Revenue in an Intermediate Tier according to:

$IR(a) = \Sigma AB \ (c=asset,s,t)(a) * \text{eff rate}(c=asset,s,t)(a),$
$COF(a) = \Sigma AB \ (c=asset),s,t)(a) * TR(c=asset,s,t)(pt(a)),$
$IE(a) = \Sigma AB \ (c=liability,s,t)(a) * \text{eff rate}(c=liability,s,t)(a), \text{ and}$
$VOF(a) = \Sigma AB \ (c=liability,s,t)(a) * TR(c=liability,s,t)(pt(a))),$ wherein:
AB(c,s,t)(a)=Average Balances of an account a based on class (c), state (s), and tier (t) characteristics of a balance type,
eff rate(c,s,t)(a)=Effective interest rate for the account a based on the class (c), state (s), and tier (t), characteristics of the balance type,
pt(a)=Product type of an account a,
TR(c,s,t)(pt(a))=Treatment Rate for the accounts a of the product type based on the class (c), state (s), and tier (t) characteristics of the balance type,
IR(a)=the Interest Revenue of the account a,
COF(a)=the Cost of Funds for the account a,
IE(a)=the Interest Expense for the account a, and
VOF(a)=the Value of Funds for the account a.

41. The system of claim 40, wherein the balance type comprises a combined effect of the class, state, and tier characteristics.

42. The system of claim 41, wherein the class characteristic is defined as either an asset or liability.

43. The system of claim 41, wherein the state characteristic is defined as either cleared, ledger, or float.

44. The system of claim 41, wherein the tier characteristic is defined as tiers used by the organization in supplying balances.

45. The system of claim 40, wherein the step of logic for calculating the Net Income Revenue in the Basic Tier generates one or more outputs selected from a group comprising the Interest Revenue, Interest Expense, Cost of Funds, Value of Funds, Lending Spread, and Deposit Spread.

46. The article of claim 24, wherein the Net Interest Revenue is calculated for every account.

47. The article of claim 24, wherein the Net Interest Revenue represents a total interest generated from all deposit and lending activities.

48. The article of claim 24, wherein the Net Interest Revenue is calculated from a Deposit Spread, a Lending Spread, and an Asset/Liability Management (ALM) Spread.

49. The article of claim 48, wherein the Deposit Spread comprises a difference between the Interest Expense and the Value of Funds.

50. The article of claim 49, wherein the Interest Expense comprises a cost of borrowing funds.

51. The article of claim 49, wherein the Value of Funds represents a rate at which borrowed funds could be invested.

52. The article of claim 48, wherein the Lending Spread comprises a difference between the Cost of Funds and the Interest Revenue.

53. The article of claim 52, wherein the Interest Revenue comprises a return generated by lending funds.

54. The article of claim 52, wherein the Costs of Funds represents an expense generated by lending funds.

55. The article of claim 48, wherein the Asset/Liability Management Spread comprises a difference between maturity characteristics of funds lent.

56. The article of claim 24, wherein the Net Interest Revenue also includes earnings on allocated equity.

57. The article of claim 56, wherein the earnings on allocated equity comprise earnings generated by lending funds from equity sources.

58. The article of claim 24, further comprising calculating the Net Income Revenue in a Basic Tier according to:

$IR(a) = AAB(a) * \text{eff rate}_{asset}(a),$
$COF(a) = AAB(a) * TR_p,$
$IE(a) = ALB(a) * \text{eff rate}_{liability}(a), \text{ and}$
$VOF(a) = ALB(a) * TR_p$ wherein:
AAB(a)=Average Asset Balance of an account a,
ALB(a)=Average Liability Balance of the account a,
eff rate$_{asset}$(a)=Effective interest rate for the account a as an asset balance,
eff rate$_{liability}$(a)=Effective interest rate for the account a as a liability balance,
$TR_p$=Treatment Rate for a product type p,
IR(a)=the Interest Revenue of the account a,
COF(a)=the Cost of Funds for the account a,
IE(a)=the Interest Expense for the account a, and
VOF(a)=the Value of Funds for the account a.

59. The article of claim 58, wherein there is a single Treatment Rate for each product type.

60. The article of claim 58, wherein the step of calculating the Net Income Revenue in the Basic Tier generates one or more outputs selected from a group comprising the Interest Revenue, Interest Expense, Cost of Funds, Value of Funds, Lending Spread, and Deposit Spread.

61. The article of claim 24, further comprising calculating the Net Income Revenue in an Intermediate Tier according to:

$IR(a) = \Sigma AB\ (c=asset,s,t)(a) * eff\ rate(c=asset,s,t)(a),$ $COF(a) = \Sigma AB\ (c=asset),s,t)(a) * TR(c=asset,s,t)(pt(a)),$ $IE(a) = \Sigma AB\ (c=liability,s,t)(a) * eff\ rate(c=liability,s,t)(a),$ and $VOF(a) = \Sigma AB\ (c=liability,s,t)(a) * TR(c=liability,s,t)(pt(a))),$ wherein:

AB(c,s,t)(a)=Average Balances of an account a based on class (c), state (s), and tier (t) characteristics of a balance type, eff rate(c,s,t)(a)=Effective interest rate for the account a based on the class (c), state (t), and tier (t) characteristics of the balance type, pt(a)=Product type of an account a, TR(c,s,t)(pt(a))=Treatment Rate for the accounts a of the product type based on the class (c), state (s), and tier (t) characteristics of the balance type, IR(a)=the Interest Revenue of the account a, COF(a)=the Cost of Funds for the account a, IE(a)=the Interest Expense for the account a, and VOF(a)=the Value of Funds for the account a.

62. The article of claim 61, wherein the balance type comprises a combined effect of the class, state, and tier characteristics.

63. The article of claim 62, wherein the class characteristic is defined as either an asset or liability.

64. The article of claim 62, wherein the state characteristic is defined as either cleared, ledger, or float.

65. The article of claim 62, wherein the tier characteristic is defined as tiers used by the organization in supplying balances.

66. The article of claim 61, wherein the step of calculating the Net Income Revenue in the Basic Tier generates one or more outputs selected from a group comprising the Interest Revenue, Interest Expense, Cost of Funds, Value of Funds, Lending Spread, and Deposit Spread.

* * * * *